(12) United States Patent
Kohda et al.

(10) Patent No.: US 9,071,306 B2
(45) Date of Patent: Jun. 30, 2015

(54) TRANSMISSION APPARATUS, RECEPTION APPARATUS, COMMUNICATION SYSTEM, CIRCUIT APPARATUS, COMMUNICATION METHOD, AND PROGRAM

(71) Applicant: International Business Machines Corporation, Armonk, NY (US)

(72) Inventors: Yasuteru Kohda, Kanagawa-ken (JP); Nobuyuki Ohba, Miyagi-ken (JP); Kohji Takano, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/197,863

(22) Filed: Mar. 5, 2014

(65) Prior Publication Data

US 2014/0301434 A1    Oct. 9, 2014

(30) Foreign Application Priority Data

Mar. 7, 2013    (JP) ................................. 2013-045107

(51) Int. Cl.
| | |
|---|---|
| H04B 15/00 | (2006.01) |
| H04L 25/49 | (2006.01) |
| H04L 27/38 | (2006.01) |
| H04B 1/04 | (2006.01) |
| H04B 17/10 | (2015.01) |

(52) U.S. Cl.
CPC ............ *H04B 1/0475* (2013.01); *H04B 17/104* (2015.01)

(58) Field of Classification Search
CPC ............ H04L 25/03343; H04L 27/368; H03F 1/3247

USPC ......... 375/261, 285, 295, 296, 298, 316, 340; 329/318; 332/107, 123, 159
See application file for complete search history.

(56) References Cited

U.S. PATENT DOCUMENTS

| | | | | |
|---|---|---|---|---|
| 6,034,997 A | * | 3/2000 | Mackenthun | 375/265 |
| 7,378,903 B2 | * | 5/2008 | Bates | 330/9 |
| 2010/0109723 A1 | * | 5/2010 | Shin | 327/143 |

FOREIGN PATENT DOCUMENTS

| | | |
|---|---|---|
| JP | 10107759 | 5/1998 |
| JP | 2000504549 | 4/2000 |
| JP | 2000278335 | 10/2000 |
| JP | 2000295305 | 10/2000 |
| JP | 2002519925 | 7/2002 |
| JP | 2003503961 | 1/2003 |

* cited by examiner

*Primary Examiner* — Tesfaldet Bocure
(74) *Attorney, Agent, or Firm* — Vazken Alexanian

(57) ABSTRACT

A communication apparatus, method, and system that reduce adverse effects caused by coupling between a transmission apparatus and a reception apparatus. The transmission apparatus includes a monitoring section that monitors an index value for a total amount of bias of a signal level in signals, a symbol identifying section that identifies a target symbol to be changed in a transmission symbol sequence comprising the signals, based on the index value for the total amount of bias of the signal level, a symbol position changing section that changes a position of the target symbol to a position of a signal point serving to reduce the bias of the signal level, and a transmission section that transmits signals included in the changed transmission symbol sequence to a reception apparatus.

16 Claims, 11 Drawing Sheets

TRANSMISSION APPARATUS, RECEPTION APPARATUS, COMMUNICATION SYSTEM, CIRCUIT APPARATUS, COMMUNICATION METHOD, AND PROGRAM

CROSS-REFERENCE TO RELATED APPLICATION

This application claims priority under 35 U.S.C. §119 from Japanese Patent Application No. 2013-045107 filed Mar. 7, 2013, the entire contents of which are incorporated herein by reference.

BACKGROUND OF THE INVENTION

1. Field of the Invention

The present invention relates to apparatuses, methods, and systems for wireless communication. More particularly, the present invention is related to a communication apparatus, method and system that make corrections for burst error in reducing bias of a signal level.

2. Description of Related Art

In wireless communication, there has recently been a growing demand to increase transmission speed in order to achieve real-time transmission and reception of rich contents such as moving images and seamless connection to wired communication. For implementation of such high-speed high-capacity data communication, there are great expectations for a millimeter wave wireless communication technique intended to achieve high-speed wireless communication exceeding a Gbps level.

A wireless communication apparatus typically includes a digital processing section (baseband) responsible exclusively for digital signal processing and an analog processing section (RF: Radio Frequency) responsible exclusively for analog signal processing. These circuit blocks are typically interconnected by AC coupling (capacitive coupling) in order to absorb a difference in I/O bias voltage and to achieve a stable operation.

The AC coupling needs to keep a DC balance, and the presence of a large number of DC components and low-frequency components makes accurate data transmission difficult. A bias of bits in a transmission signal results in a DC offset component, and thus, a preprocess is typically carried out using a scrambler or a data coding technique to sufficiently diffuse transmission bits to prevent the bits from being biased. Examples of the data coding include 8b10b coding, bit stuffing as discussed in S. Aviran, et. al, "An Improvement to the Bit Stuffing Algorithm", IEEE Trans. Inform. Theory, Vol. 51, pp 2885-2891, 2004, and Fibonacci coding as discussed in A. S. Fraenkel, et. al, "Robust Universal Complete Codes for Transmission and Compression", Discrete Applied Mathematics, vol. 64, pp 31-55, 1996.

However, the above-decried data coding techniques insert additional bits, and thus, coding efficiency decreases in return. On the other hand, the sole scrambler apparently uniformly diffuses the bits but may cause a bias as a result of the scrambling, which may in turn increase an error rate.

On the other hand, the wireless communication assumes data transmission in an environment with a lower signal to noise ratio (SNR) than the wired communication, and thus involves a powerful error correcting code also in accordance with wireless communication standards. The error correcting code enables sporadic, single- or double-bit random errors to be efficiently corrected.

However, a typical error correcting code may fail to completely correct a burst error in which a large number of errors concentrate in a short interval. Errors caused by the above-described DC offset occur consecutively once the DC offset reaches a specific value or larger, resulting in a burst error. This conventionally is a factor that significantly reduces an effective transmission rate. In other cases, the burst error leads to the need to increase a circuit scale and power consumption in order to achieve more powerful error correction.

Thus, a novel technique has still been desired to be developed which enables suitable prevention of a burst error caused by a variation in reference level associated with coupling and observed on a reception apparatus side, without the need for insertion of additional bits such as coding.

SUMMARY OF THE INVENTION

In view of the problems with the conventional art, it is an object of the present invention to provide a transmission apparatus, a reception apparatus, a communication system, a circuit apparatus, a communication method, and a program which enable a suitable reduction in possible burst errors caused by a variation in reference level associated with coupling and observed on a reception apparatus side.

To achieve the above-described object, the present invention provides a transmission apparatus characterized as described below. The transmission apparatus includes a monitoring section that monitors an index value for a total amount of bias of a signal level in signals; a symbol identifying section that identifies a target symbol to be changed in a transmission symbol sequence containing the signals, based on the index value for the total amount of bias of the signal level; that changes a position of the target symbol to a position of a signal point that serves to reduce the bias of the signal level; and a transmission section that transmits signals included in a changed transmission symbol sequence to the reception apparatus.

The present invention also provides a reception apparatus communicatively coupled to a transmission apparatus. The reception apparatus includes a reception section that receives signals included in a received symbol sequence sent from the transmission apparatus and an error correcting section that corrects an error in the received symbol sequence. The reception apparatus is characterized in that, at this time, a comparison between the received symbol sequence and the received symbol sequence with corrected error indicates that the received symbol sequence with corrected error includes at least a change in a symbol position of a symbol received when or after a total amount of bias of a signal level calculated from a reference point in time is equal to or larger than a predetermined reference, where the change in the symbol position serving to reduce the bias of the signal level.

The present invention also provides a circuit apparatus that generates a signal output to a succeeding stage via a coupling element and characterized as described below. The circuit apparatus includes a monitoring section that monitors an index value for a total amount of bias of a signal level in signals; a symbol identifying section that identifies a target symbol to be changed in a transmission symbol sequence comprising the signals, based on the index value for the total amount of bias of the signal level that changes a position of the target symbol to a position of a signal point serving to reduce a bias of the signal level; and an output section that outputs signals included in the changed transmission symbol sequence to a succeeding stage.

Furthermore, the present invention provides a communication method carried out between the reception apparatus and a transmission apparatus able to communicate with the reception apparatus. The communication method includes the steps of: monitoring, using the transmission apparatus, an index value for a total amount of bias of a signal level in signals; identifying, using the transmission apparatus, a target symbol to be changed in a transmission symbol sequence including the signals, based on the index value for the total amount of bias of the signal level; changing, using the transmission apparatus, a position of the target symbol to a position of a signal point serving to reduce the bias of the signal level; and, using the transmission apparatus, signals included in the changed transmission symbol sequence to the reception apparatus.

The present invention also provides a communication system that includes a a reception apparatus and a transmission apparatus communicatively coupled to the reception apparatus. The transmission apparatus includes a monitoring section configured to monitor an index value for a total amount of bias of a signal level in signals; a symbol identifying section configured to identify a target symbol to be changed in a transmission symbol sequence comprising the signals, based on the index value for the total amount of bias of the signal level; a symbol position changing section configured to change a position of the target symbol to a position of a signal point where the bias of the signal level is reduced; and a transmission section configured to transmit signals included in the changed transmission symbol sequence to the reception apparatus. The reception apparatus includes a reception section configured to receive signals included in a received symbol sequence sent from the transmission apparatus; and an error correcting section configured to correct an error in the received symbol sequence.

The above-described configuration enables a suitable reduction in possible burst errors caused by a variation in reference level associated with coupling and observed on the reception apparatus side.

BRIEF DESCRIPTION OF THE DRAWINGS

FIG. 5 is a diagram showing a constellation for QAM and codes assigned to signal points. More specifically:

FIG. 8 is a diagram illustrating an offset compensating process on a transmission side along with signal waveforms. More specifically:

FIG. 9 is a diagram showing a temporal variation in the total amount of bias of a signal level observed during transmission of a predetermined symbol sequence, along with a transmission symbol sequence. More specifically:

DETAILED DESCRIPTION OF THE PREFERRED EMBODIMENTS

An embodiment of the present invention will be described below. However, the present invention is not limited to the embodiment described below. In the embodiment below, wireless communication apparatus 110 and wireless communication system 100 including wireless communication apparatus 110 are described as an example of a transmission apparatus and a communication system including the transmission apparatus.

Figure 1:
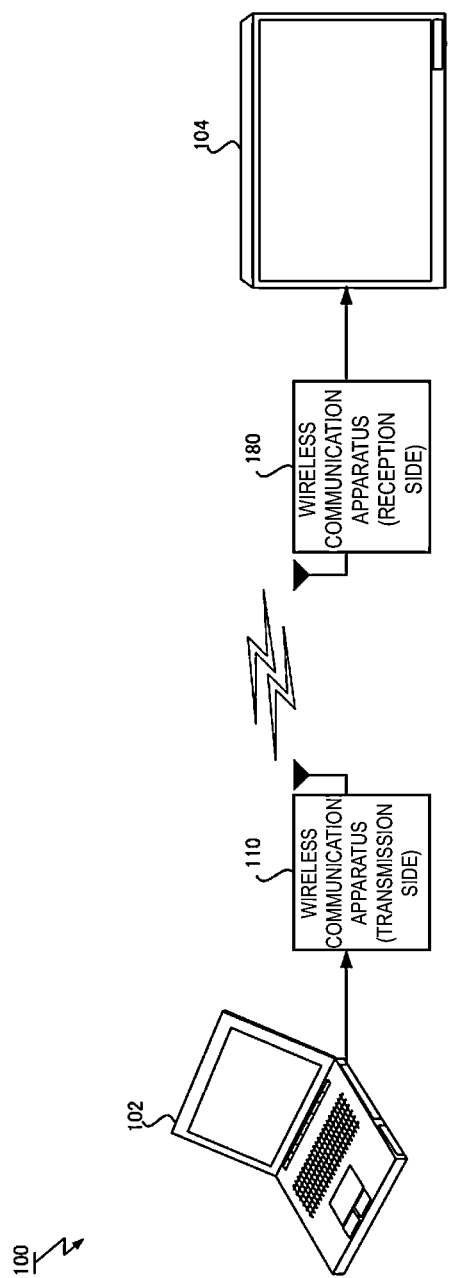
FIG. 1 is a schematic diagram showing a wireless communication system according to an embodiment of the present invention.

FIG. 1 is a schematic diagram of wireless communication system 100 according to the embodiment of the present invention. Wireless communication system 100, according to the embodiment, includes a first wireless communication apparatus 110 and a second wireless communication apparatus 180. Wireless communication apparatus 110 and wireless communication apparatus 180 establish wireless communication based on electromagnetic waves with, for example, a several tens of GHz frequency band (millimeter waves) to achieve a data communication speed of several Gbps or higher. Wireless communication apparatuses 110 and 180 can communicate data to each other both as a transceiver and as a receiver. However, for convenience of description, the first wireless communication apparatus 110 is also referred to as a transmission side, or transmission side wireless communication apparatus 110, and the second wireless communication apparatus 180 is also referred to as a reception side, or reception side wireless communication apparatus 180.

Wireless communication apparatus 110 transmits data to be transmitted on frames to the destination wireless communication apparatus 180. In an example illustrated in FIG. 1, notebook personal computer 102 is connected to wireless communication apparatus 110. Display apparatus 104 is connected to wireless communication apparatus 180. According to the illustrative embodiment as described above, wireless communication apparatus 110 can transmit, on frames, content data such as moving images which is received from notebook personal computer 102, to wireless communication apparatus 180. Display apparatus 104 can acquire the content data from wireless communication apparatus 180 and display contents on a screen of display apparatus 104.

Figure 2:
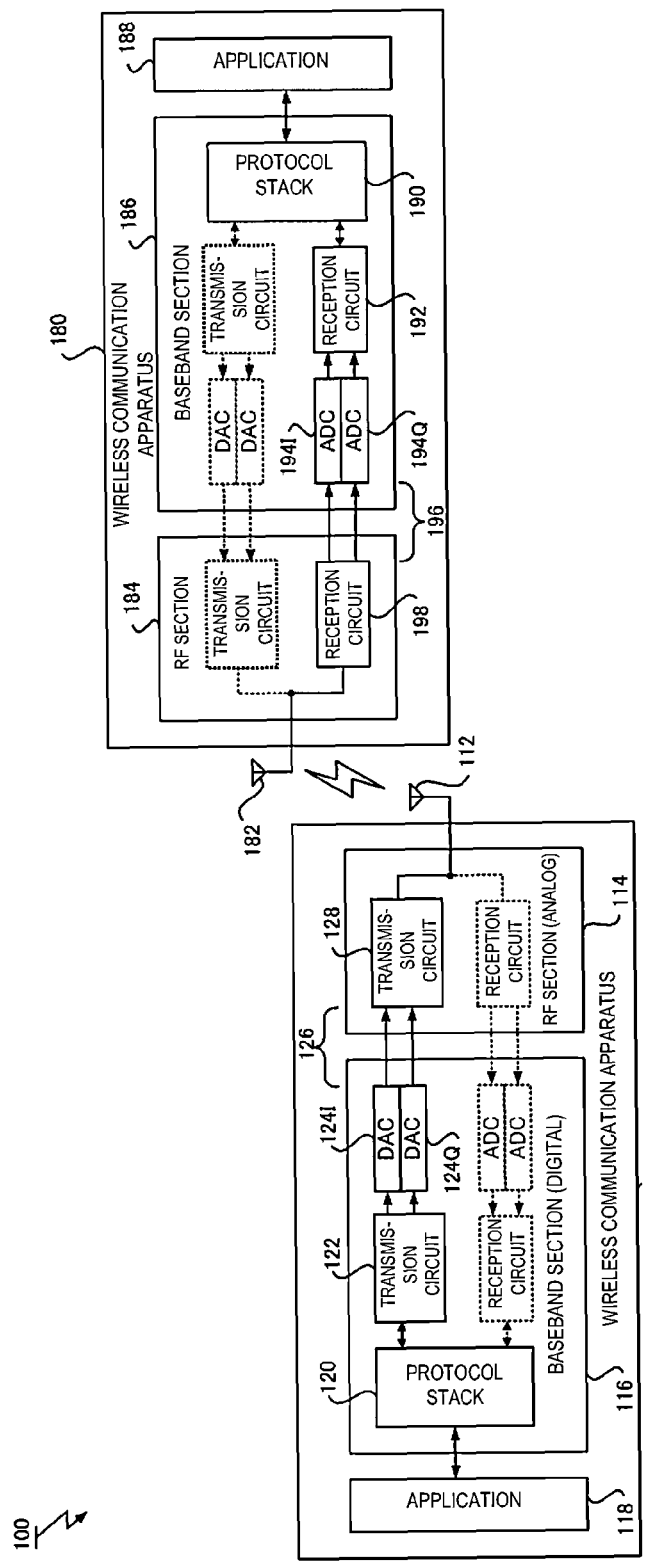
FIG. 2 is a block diagram showing a functional configuration of a wireless communication apparatus in a wireless communication system according to an embodiment of the present invention.

FIG. 2 is a block diagram showing a functional configuration of wireless communication apparatuses 110 and 180 in wireless communication system 100 according to an embodiment of the present invention. Wireless communication apparatus 110 shown in FIG. 2 includes antenna 112, Radio Frequency (RF) section 114 responsible for an analog process, baseband section 116 responsible for a digital process, and a succeeding application engine 118. Wireless communication apparatus 180 similarly includes antenna 182, RF section 184, baseband section 186, and application engine 188.

Antennas 112 and 182 receive a magnetoelectric wave propagated through space, convert the magnetoelectric wave into an electric signal, and input the electric signal to RF sections 114 and 184, respectively. During transmission, antennas 112 and 182 convert an electric signal received from RF sections 114 and 184 into an electromagnetic wave and radiate the electromagnetic wave to space. RF sections 114 and 184 are circuit blocks that process a signal in the frequency band of an electromagnetic wave that is a carrier wave. RF sections 114 and 184 include transmission circuit 128 and reception circuit 198, respectively. Each of RF sections 114 and 184 modulates, during transmission, a received base band signal into a signal in an RF frequency band, and during reception, demodulates the signal in the RF frequency band into the baseband signal.

It should be noted that, in FIG. 2, components present on a transmission path on the wireless communication apparatus 110 side are denoted by reference numerals and components not located on the transmission path are not denoted by reference numerals but are shown by dotted lines. On the wireless communication apparatus 180 side as well, components not located on a reception path are not denoted by reference numerals but are shown by dotted lines, in contrast to the transmission side.

The baseband signal is an unmodulated signal or a demodulated signal. For a binary signal, the baseband signal corresponds to a rectangular wave formed of signal levels expressing "0" and "1". For a multilevel signal, the baseband signal corresponds to a rectangular signal wave with a plurality of signal levels expressing the respective values. RF sections 114 and 184 multiply the baseband signal by the carrier wave and add the two waves together to generate a transmission signal.

Baseband sections 116 and 186 are circuit blocks that process an unmodulated baseband signal or a demodulated baseband signal. During transmission, baseband sections 116 and 186 generate a transmission baseband signal based on transmission data (bit sequence) received from the succeeding applications 118 and 188 and output the signal to RF sections 114 and 184. During reception, baseband sections 116 and 186 restore reception data (bit sequence) based on the reception baseband signal demodulated by RF sections 114 and 184 and output the reception data to the succeeding applications 118 and 188.

More specifically, baseband sections 116 and 186 include protocol stacks 120 and 190, transmission circuit 122, Digital to Analog Converter (DAC) 124, reception circuit 192, and Analog to Digital Converter (ADC) 194. Protocol stacks 120 and 190 are responsible for processing a group of hierarchical communication protocols such as a physical layer, a data link layer, a network layer, and a transport layer. Protocol stacks 120 and 190 perform control of a Medium Access Control (MAC) layer such as retransmission control for a bit error and a packet error, control of a transmission timing, and control of acknowledgement (ACK), and the like.

Transmission circuit 122 modulates transmission data received from protocol stack 120 in accordance with a modulation scheme adopted, to generate transmission baseband data, and outputs the transmission baseband data to transmission circuit 128 of RF section 114 via DAC 124 as a transmission baseband signal. Reception circuit 192 acquires a reception baseband signal demodulated by reception circuit 198 of RF section 184 via ADC 194 as reception baseband data, restores the reception data in accordance with the modulation scheme, and outputs the restored reception data to protocol stack 190.

The embodiment described below adopts a quadrature amplitude modulation (QAM) scheme, in which data is transmitted by modulating the amplitudes and phases of two carrier waves, though the embodiment is not particularly limited to this scheme. The two carrier waves, that is, an in-phase (I phase) carrier wave and a quadrature (Q phase) carrier wave have a quadrature phase relation and are independent of each other.

In conjunction with the adoption of the above-described modulation scheme, in the present embodiment, the baseband signal (baseband data) has an I phase component and a Q phase component, and I phase DAC 124I, Q phase DAC 124Q, I phase ADC 194I, and Q phase ADC 194Q are provided on the I phase transmission path and the Q phase transmission path. The I phase baseband signal and the Q phase baseband signal specify signal points representing respective symbols on a signal space diagram (constellation diagram), based on signal levels at each point in time, to form a symbol sequence of transmission data.

The modulation scheme adopted is predetermined within wireless communication system 100 so that wireless communication apparatuses 110 and 180 carry out processing in accordance with a predetermined procedure. Furthermore, in the embodiment described below, MQAM (M-ary QAM) is described as an example of a suitably applicable modulation scheme, but the modulation scheme is not particularly limited. Another modulation scheme such as MPSK (M-ary Phase Shift Keying) scheme may be adopted.

RF sections 114 and 184 and baseband sections 116 and 186 are typically interconnected by AC couplings 126 and 196. As described above, when the circuit blocks are AC-coupled together, a DC balance needs to be kept for signals. Thus, the present embodiment carries out a preprocess such as pre-randomization, by a scrambler, of bits in transmission data to prevent the bits from being biased.

However, even when the scrambler performs the randomization, such a bias that involves consecutive or frequent occurrences of the same signal level for a predetermined period stochastically occurs as a result of the scrambling. Such a bias of the signal level may disrupt the DC balance and introduce a DC offset, increasing the error rate. In particular, if a modulation scheme such as QAM is adopted in which information is carried in an amplitude direction, the DC offset component exerts a non-negligible adverse effect on a determination at a determination boundary in the amplitude direction. Furthermore, an increase in data rate makes the adverse effect of the DC offset associated with the AC coupling more significant.

The wireless communication assumes data transmission in an environment with a lower SNR than the wired communication, and thus involves a sufficient error correcting code also due to the requirements of the standards. Thus, focusing on the sufficient error correcting capability, when the bias of the signal level becomes significant, in expectation of error correction on the reception side, wireless communication system 100, according to the present embodiment, changes the position of a signal point for a symbol, intentionally introduces an error in a manner in which the error can be corrected by the error correcting capability of the system, and in return, carries out signal processing that eliminates the bias of the signal level. Now, with reference to FIGS. 3 through 9, the signal processing carried out by the transmission side wireless communication apparatus 110 will be described in detail.

Figure 3:
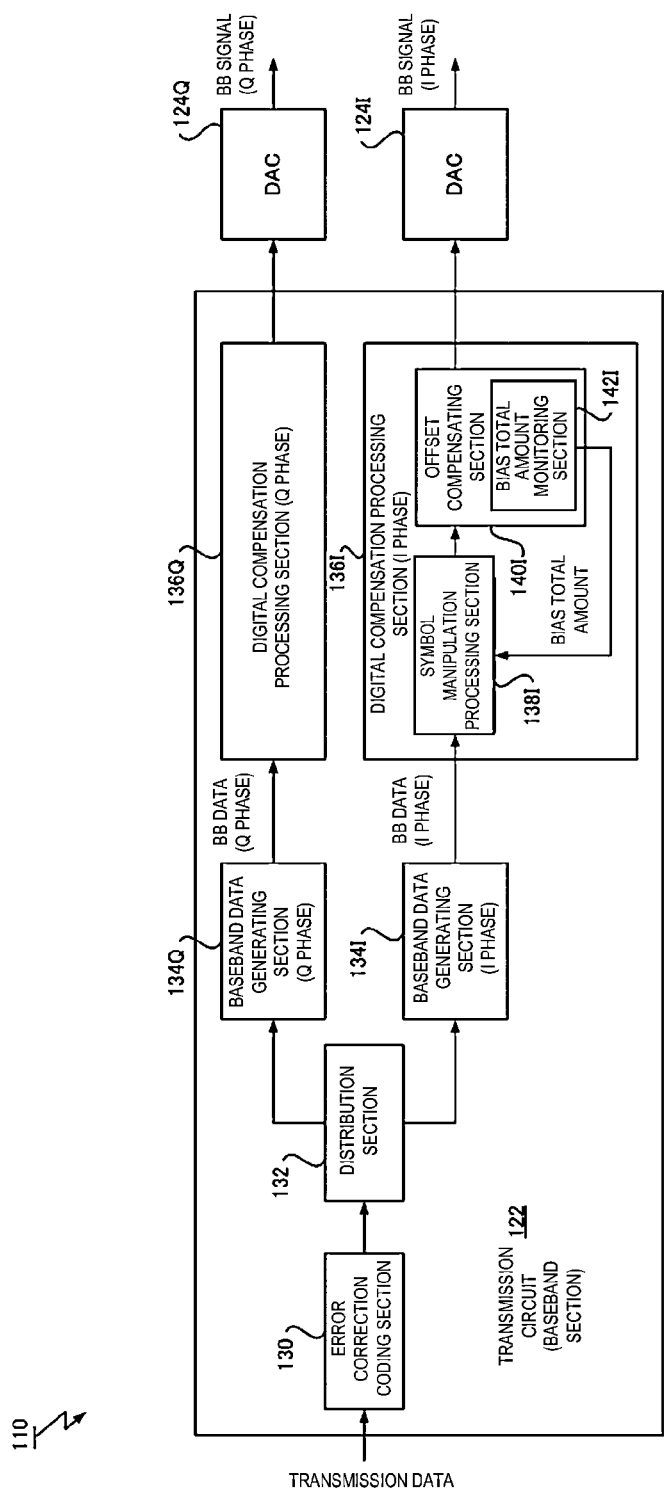
FIG. 3 is a detailed block diagram of a transmission circuit in a transmission side baseband section according to an embodiment of the present invention.
Figure 4:
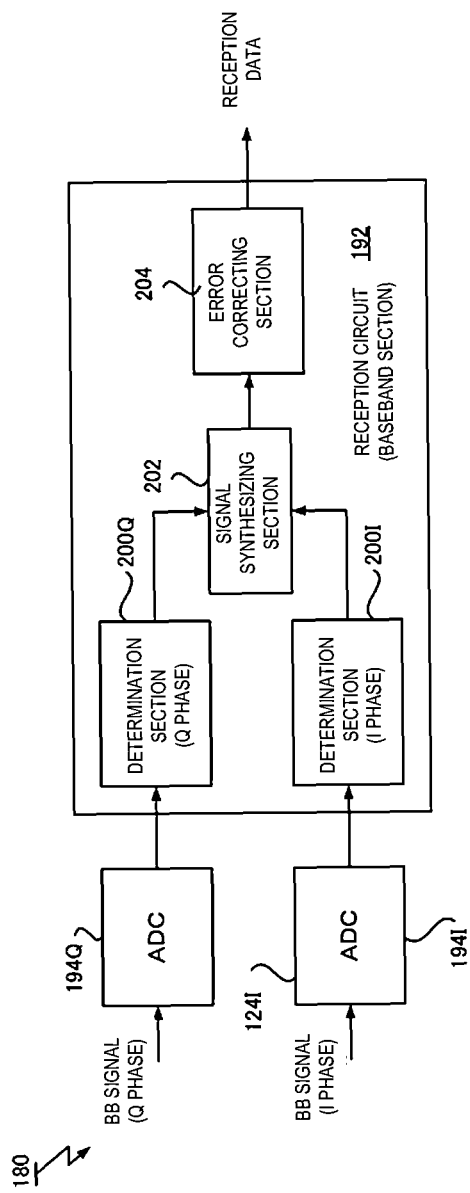
FIG. 4 is a detailed block diagram of a reception circuit in a reception side baseband section according to an embodiment of the present invention.

FIG. 3 shows a detailed block diagram of transmission circuit 122 in the transmission side baseband section 116 according to an embodiment of the present invention. Furthermore, FIG. 4 shows a detailed block diagram of reception circuit 192 in the reception side baseband section 186 according to an embodiment of the present invention. It should be noted that FIG. 3 and FIG. 4 show a main configuration associated with the signal processing based on the intentional error introduction according to the present embodiment and that illustration of peripheral elements such as filters, synchronous detection, and clock regeneration is omitted.

Transmission circuit 122 in the transmission side baseband section 116 shown in FIG. 3 includes error correction coding section 130, distribution section 132, I phase baseband data generating section 134I and Q phase baseband data generating section 134Q, and digital correction processing sections 136I and 136Q.

Error correction coding section 130 carries out a coding process of applying redundancy to enable the reception side to perform error detection and error correction. Error correction coding section 130 can adopt various such error correcting codes as adopted by wireless communication standards. Examples of the error correcting code scheme include block codes such as a Reed-Solomon (RS) code and an LDPC (Low Density Parity Check) code specified in IEEE (The Institute of Electrical and Electronics Engineers, Inc.) 802.15.3c, a convolutional code, and a coupling of these schemes.

Distribution section 132 receives coded transmission data (bit sequence) and distributes the data in an I phase bit stream and a Q phase bit stream. Based on the bit streams distributed by distribution section 132, baseband data generating sections 134 use a predetermined modulation scheme (an amplitude-shift keying (ASK) scheme for QAM) to carry out modulation to generate baseband data for the respective phases and output the baseband data to the respective digital correction processing sections 136. Digital correction processing sections 136 carry out a transmission side correction process on the baseband data for the respective phases. The baseband data on which the digital correction process has been carried out thereon is input to the respective DACs 124 and output to transmission circuit 128 in the succeeding RF section 114 via AC coupling 126 as baseband signals. The baseband signals are transmitted on carrier waves to the reception side wireless communication apparatus 180.

On the other hand, reception circuit 192 in the reception side baseband section 186 shown in FIG. 4 includes I phase determination section 200I and Q phase determination section 200Q, signal synthesizing section 202, and error correction decoding section 204. When signals are received from the transmission side wireless communication apparatus 110, reception circuit 198 in the preceding RF section 184 inputs the baseband signals to ADCs 194 for the respective phases via AC coupling 126. The baseband signals for the respective phases are converted into baseband data by the respective ADCs 194, and the baseband data is input to determination sections 200I and 200Q.

Upon receiving the baseband data digitalized by ADCs 194, determination sections 200 demodulate the baseband data by the predetermined modulation scheme (the amplitude-shift keying scheme for QAM) to generate bit streams for the respective phases. Upon receiving the I and Q phase bit streams, signal synthesizing section 202 reconfigures the bit streams into reception data (bit sequence). Error correction decoding section 204 corresponds to the transmission side error correction coding section 130. Error correction decoding section 204 corrects an error in the reception data caused by noise on the transmission path or the like and outputs the corrected reception data to the succeeding stage.

Referring back to FIG. 3, functional blocks of digital correction processing section 136 are further shown in detail. More specifically, digital correction processing section 136 includes symbol manipulation processing section 138 and bias total amount monitoring section 142. It should be noted that illustration of a detailed configuration on the Q phase path is omitted from FIG. 3 and that a configuration similar to the configuration for the I phase is provided on the Q phase path.

Bias total amount monitoring section 142 monitors the total amount of bias of the signal level in the baseband signal from a reference point in time, and calculates an index value for evaluating the total amount of bias. The index value for the bias total amount can be determined by calculating, for each sample point in the input baseband data (a symbol (signal point) is specified by data values for sample points in the I and Q phases), a difference between the corresponding data value and a data value (median value) corresponding to the reference level, and accumulating the difference from the reference point in time. The reference point in time may be a start point for a transmission frame, and in this case, the index value for the bias total amount is reset for each frame.

The index value for the bias total amount calculated by bias total amount monitoring section 142 is output to symbol manipulation processing section 138. FIG. 3 shows a particular preferable embodiment, and bias total amount monitoring section 142 is included as a component of offset compensating section 140, which implements DC offset compensation for the baseband signal. The DC offset compensating process performed by offset compensating section 140 will be described below in detail.

The bias of the signal level monitored by bias total amount monitoring section 142 may disrupt the DC balance of the signal and vary (DC offset) the reference level for the reception baseband signal in the reception side wireless communication apparatus 180 due to the coupling present between wireless communication apparatuses 110 and 180. Once the reference level varies to the degree that determination section 200 makes an erroneous determination, a burst error may occur, which is difficult to deal with by the capabilities of error correction coding section 130 and error correction decoding section 204. As a result, an execution transmission speed significantly decreases.

Symbol manipulation processing section 138 performs symbol manipulation so as to eliminate the bias of the signal level based on the index value for the total amount of bias of the signal level as described above. The above-described difference accumulated value may be used directly as the index value for the bias total amount monitored. On the other hand, the DC offset varies depending on a time constant for the coupling present between wireless communication apparatuses 110 and 180 involved in transmission and reception, and thus, the difference accumulated value multiplied by the pre-measured time constant for the coupling can be used as the index value for the bias total amount.

Moreover, the index value for the bias total amount is not limited to the above-described value but can be any calculated or measured value provided that the value is indicative of the total amount of bias of the signal level in the baseband signal. For example, not only the difference accumulated value can be determined for all the symbols, but the symbols can also be culled for sampling to allow an approximate difference accumulated value to be determined. Moreover, instead of digitally calculating the baseband data, analog-converted baseband signals can be integrated from the reference point in time by an integration circuit, and signals output by the integration circuit can be sampled to determine the index value for the bias total amount.

Symbol manipulation processing section 138 identifies the target symbol to be changed in the transmission symbol sequence based on the index value for the total amount of bias of the signal level as described above. Symbol manipulation processing section 138 then changes the position of a signal point for the identified target symbol on a signal space diagram. More specifically, symbol manipulation processing section 138 identifies, as a target to be changed, such a symbol that further increases the bias of the signal level if the index value for the total amount of the bias falls out of an allowable reference range, that is, a symbol with a signal level in the same direction as that of the bias. Symbol manipulation processing section 138 changes the position of the target symbol expected to increase the bias to the position of such a signal point as reduces the bias of the signal level, that is, to the position of a signal point with a signal level in a direction opposite to the direction of the bias. Symbol manipulation processing section 138 forms a symbol identifying section and a symbol position changing section in the present embodiment.

As shown in FIG. 3, symbol manipulation processing section 138 and bias total amount monitoring section 142 are responsible for baseband data for a particular phase (for example, the I phase) and are not necessarily conscious of a symbol specified by both the I phase and the Q phase. If the index value for the total amount of the bias falls out of the reference range, a symbol with a signal level, for example, +3, in the same direction as that of the bias, for example, a + direction, is identified as a target symbol. At this time, if a plurality of symbols have a signal level in the same direction, one of the symbols which has a higher signal level is preferably selected as a target symbol. Symbol manipulation processing section 138 inverts the signal level of the particular axis in the target symbol. For example, symbol manipulation processing section 138 inverts the signal level +3 of the I axis to −3.

Figure 5A:
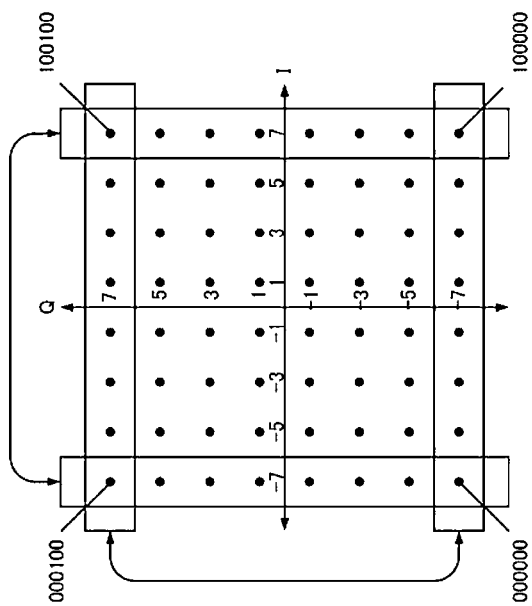
FIG. 5(A) illustrates a case of 16QAM.
Figure 5B:
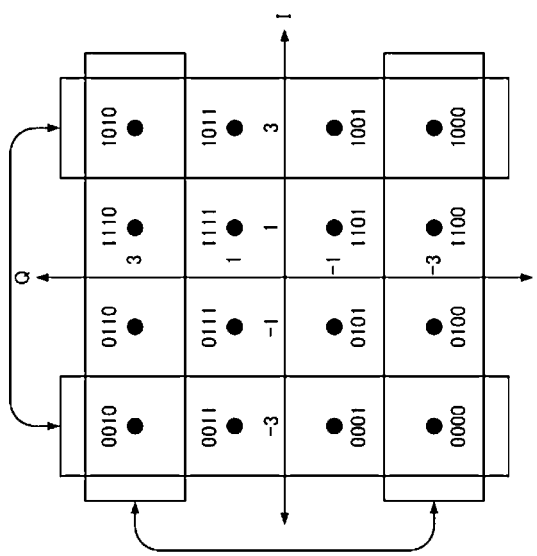
FIG. 5(B) illustrates a case of 64QAM.

FIG. 5 shows a constellation for QAM along with codes assigned to signal points. FIG. 5(A) illustrates a case of 16QAM and FIG. 5(B) illustrates a case of 64QAM. FIG. 5 further shows a preferred aspect of changes between signal points by frames and arrows.

As shown in FIG. 5, changes are preferably made to such signal points as have higher signal levels and provide, when inverted, a larger voltage difference. On the other hand, a smaller change in code between the unchanged signal point and the changed signal point is preferred in terms of error correction. The constellation for QAM shown in FIG. 5 is formed using a Grey code so that the codes of adjacent signal points differ by 1 bit from each other. At the same time, the constellation for QAM is configured such that the codes of signal points in a symmetric positional relation with each other with respect to an axis also differ by 1 bit. It is understood that if such a mapping as shown in FIG. 5 is adopted, inversion of signal levels on a particular axis, for example, the I axis, allows an error to be introduced in a manner in which the error can be suitably easily corrected. This is because two signal points associated with this inversion have the minimum Hamming distance (edit distance) between codes assigned to the signal points.

According to the preferred embodiment, symbol manipulation processing section 138 can change the positions of signal points of symbols which points meet one or both of a condition for minimizing the Hamming distance between the codes represented by the unchanged signal point and the changed signal point and a condition for maximizing the difference in signal level between the unchanged signal point and the changed signal point. These correspondence relations can, for example, be pre-held in a table according to the mapping adopted.

The above-described change in the positions of the signal points on the signal space diagram introduces an error in a manner in which the error can be corrected based on the error correcting capability. In return for the error introduction, the above-described bias of the signal level is to be eliminated. The reception side error correction decoding section 204 detects and corrects the error in the baseband data included in the changed transmission symbol sequence. The preferred embodiment is characterized in that at this time, a comparison between the symbol sequence received by the reception side wireless communication apparatus 180 and the corrected symbol sequence indicates that the position of at least one symbol received when or after the index value for the total amount falls out of the allowable range has been changed so as to reduce the bias of the signal level.

As described above, the intentional error introduction is carried out both in the I phase and in the Q phase. However, an error introduced into the same symbol in the I and Q phases may result in a double bit error in the data. The I phase and the Q phase can be independently processed given that the system is able to correct double bit errors. On the other hand, an embodiment in which the system is not able to correct double bit errors can preset symbol manipulation processing sections 138 for the I and Q phases to avoid identifying the same target symbol in a duplicate manner or can controllably exclude a symbol into which an error has been introduced in one of the phases from change targets for the other phase.

Figure 6:
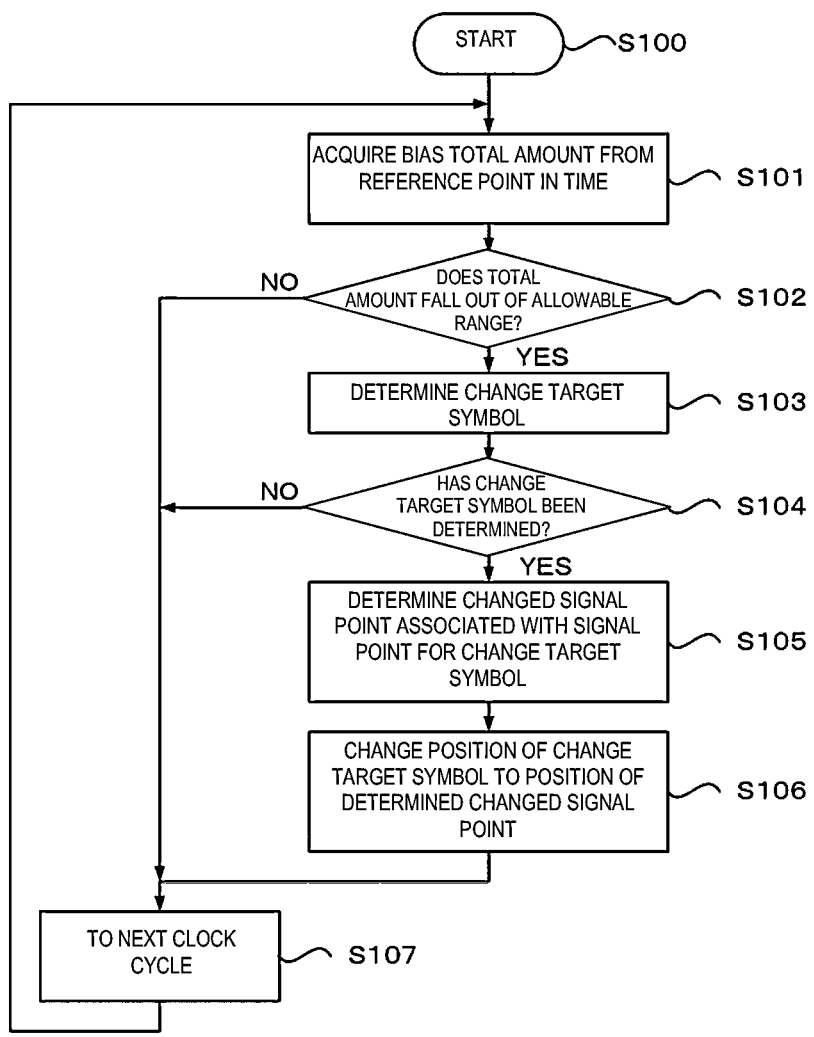
FIG. 6 is a flowchart showing a symbol operation process carried out by a symbol manipulation processing section according to an embodiment of the present invention.

FIG. 6 is a flowchart showing a symbol manipulation process carried out by symbol manipulation processing section 138 according to the present embodiment. The process shown in FIG. 6 is started in step S100 in response to the start of a process of transmission to wireless communication apparatus 180. In step S101, symbol manipulation processing section 138 acquires the index value for the total amount of bias of the signal level calculated in the last clock cycle from bias total amount monitoring section 142.

Step S102 determines whether the index for the bias total amount falls out of the allowable range in view of a predetermined reference. The allowable range is not particularly limited, but can be, in a preferred embodiment involving offset compensation described below, a value determined according to the range within which the correction function can carry out offset compensation. Alternatively, the value can be determined according to the allowable range of an actual DC offset variation within which a determination process is prevented from being erroneously carried out.

If step S102 determines that the index value does not fall out of the allowable range (NO), then in step S107, the process proceeds to the next clock cycle and loops to step S101. On the other hand, if step S102 determines that the index value falls out of the allowable range (YES), the process branches to step S103.

In step S103, symbol manipulation processing section 138 determines whether the symbol is targeted for a change. In an embodiment in which one symbol is processed during each clock cycle, when a symbol to be processed has a signal level in the same direction as that of the bias and a change between signal points shown in FIG. 5 corresponds to defined signal points, the symbol to be processed is determined to be a change target. When a plurality of symbols is processed per clock cycle, if any of the plurality of symbols currently being a processing target is appropriate as a change target as described above, the symbol is determined to be a change target.

Moreover, a preferred embodiment sets the minimum error introduction interval with which the next intentional error introduction is excluded so as to prevent a large number of intentional error introductions from being carried out within a short period. In the determination in step S103, the preferred embodiment excludes, from determination targets, symbols not having experienced an elapse of at least the minimum error introduction interval since the last introduction of an error.

The minimum error introduction interval can have a fixed value according to a specification for the wireless communication apparatus regarding the error correcting capability or the like, but can be dynamically reset taking noise on the transmission path into account. For example, the process can be configured to receive a notification of the number of error corrections from the reception side wireless communication apparatus 180 and to determine a noise environment on the path according to the notified count value of the error corrections to reset the minimum error introduction interval. Alternatively, the process may involve transmitting a test signal, waiting for an acknowledgement (ACK) from the reception side wireless communication apparatus 180, and adjustably increasing or reducing the minimum error introduction interval so as to receive a successful response indicative of reception completion from the reception side wireless communication apparatus 180. This is because the lack of a successful response indicates that an error of an uncorrectable degree has occurred and that the minimum error introduction interval is extremely short for noise on the path.

In step S104, symbol manipulation processing section 138 branches the process depending on whether or not a change target symbol has been identified in the determination in step S103. If no change target symbol has been identified in step S104 (NO), the process proceeds to the next clock cycle in step S107 and loops to step S101. Symbol manipulation during the current cycle is avoided, for example, if no symbol with a signal level in the same direction as that of the bias is present in the process target symbols or if the elapsed time from the last symbol manipulation is shorter than the minimum error introduction interval.

On the other hand, if a change target symbol has been identified (YES), the process branches to step S105. In step S105, symbol manipulation processing section 138 determines a changed signal point associated with the signal point of the identified change target symbol. In step S106, symbol manipulation processing section 138 inverts the signal level of the change target symbol so that the position of the signal point for the symbol changes to the position of the determined signal point. In step S107, the process proceeds to the next clock cycle and loops to step S101.

The processing in step S101 to step S107 is repeated for each symbol, which allows the appropriate symbol to be manipulated in a timely manner while monitoring the bias of the signal, enabling the reception side to introduce a correctable error so as to eliminate the bias.

The DC offset compensating process carried out by offset compensating section 140 according to a preferred embodiment will be described below with reference to FIGS. 3, 7, and 8. Offset compensating section 140 shown in FIG. 3 carries out a correction process of deforming the output waveform of the baseband signal so as to offset a variation in reference level observed on the reception side.

Offset compensating section 140 holds parameters for the correction process. More specifically, offset compensating section 140 holds a variation model for the reference level of the baseband signal on the reception side. The variation model models a variation in the reference level of the baseband signal observed on the reception side and caused by capacitive coupling present all over the communication path between wireless communication apparatus 110, serving as the transmission side, and wireless communication apparatus 180, serving as a communication target side. The variation caused by the capacitive coupling can be characterized by a time constant. The time constant for the capacitive coupling is determined as the variation model according to the described embodiment.

The capacitive coupling taken into account for the variation model includes not only AC coupling 126 in the interconnection between RF section 114 and baseband section 116 on the transmission side shown in FIG. 2, but also AC coupling 196 in the interconnection between RF section 184 and baseband section 186 on the reception side, mixers in transmission circuit 128 and reception circuit 198 in RF sections 114 and 184 on the transmission and reception sides, respectively, and other coupling circuits interposed in the transmission path and the like. When the capacitive element components present all over the communication path are thus corrected, including intentional or parasitic capacitive element components present between wireless communication apparatus 110 and wireless communication apparatus 180, a variation in reference level observed on the reception side can be suitably compensated for to allow the signal level to be properly determined.

The variation model can be formed based on the results of the actual transmission and reception of signals between wireless communication apparatuses 110 and 180 based on test data during a calibration process before communication. Offset compensating section 140 calculates a compensation value needed to offset a variation in DC offset. Then, the output waveform of the baseband signal is deformed in accordance with the calculated compensation value for the DC offset.

Figure 7:
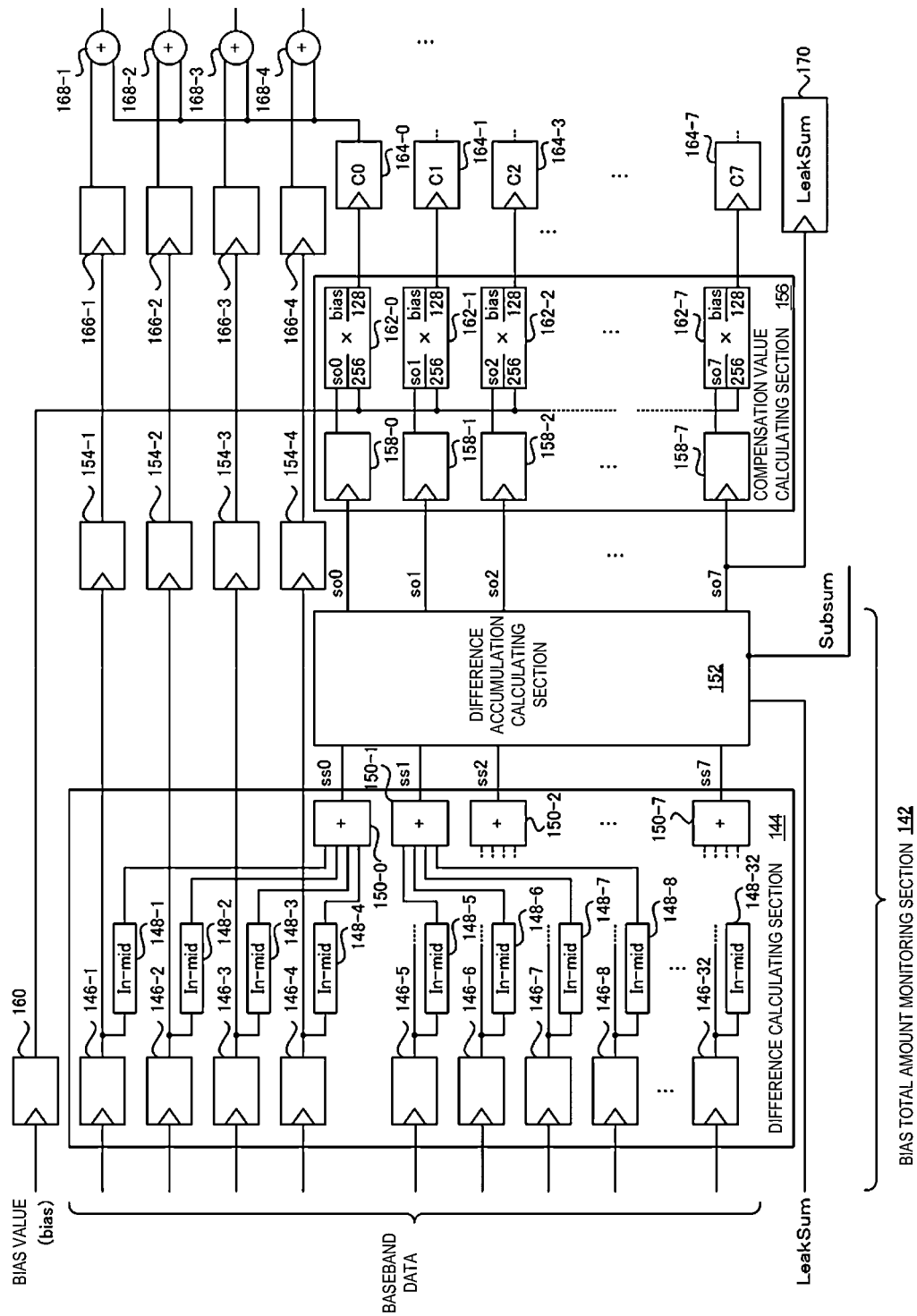
FIG. 7 is a block diagram showing a circuit configuration of an offset compensating section according to the embodiment.

FIG. 7 is a block diagram showing a circuit configuration of offset compensating section 140 according to the present embodiment. Offset compensating section 140 includes difference calculating section 144, difference accumulation calculating section 152, compensation value calculating section 156, and adder 168. Difference calculating section 144 calculates, for each sample point in the input baseband data, the difference between the corresponding data value and a data value—the median value—corresponding to the reference level. Difference accumulation calculating section 152 calculates the accumulated value of the difference from a predetermined reference point in time to each sample point. Compensation value calculating section 156 uses multiplier 162 to multiply the accumulated difference value up to each sample point in the baseband data by bias value 160—a correction parameter depending on the time constant for the variation model—depending on the variation model to calculate a compensation value for compensating for a variation in DC offset at a point in time corresponding to each sample point.

Adder 168 adds the calculated compensation value to the data value corresponding to each sample point in the baseband data. In the described embodiment, the output waveform of the baseband signal is deformed by inputting the sum of the compensation value and the data value corresponding to each sample point in the original baseband data to the DAC 124, which then converts the sum into a voltage signal. This offsets the variation in DC offset on the reception side to vary the output voltage of the original base band signal at each point in time to be higher or lower so that the reception side can obtain an ideal signal waveform.

According to the embodiment shown in FIG. 7, the baseband data is input in parallel for every predetermined number of samples (in an example shown in FIG. 7, 32 symbols), and the above-described difference, accumulated difference value, and compensation value are calculated in parallel for every predetermined number of samples (in the example illustrated in FIG. 7, 4 symbols; this unit is hereinafter referred to as a "calculation unit"). Furthermore, FIG. 7 illustrates a circuit configuration pipelined at three clock cycles.

Difference calculating section 144 and difference accumulating section 152, included in the blocks shown in FIG. 7, can form bias total amount monitoring section 142. More specifically, difference calculating section 144 includes latch registers 146-1 to 146-32 which hold the respective DAC values, or data values, included in the input baseband data and the number of which is equal to the predetermined number of the samples, as well as difference calculators 148-1 to 148-32 and difference sum calculators 150-0 to 150-7.

Each difference calculator 148 calculates the difference between the DAC value held in the corresponding latch register 146 and a signal reference value mid. In this exemplary embodiment, given that the DAC value contains 8 bits, a median value "128" can be used. Each difference sum calculator 150 receives the difference values from the difference calculators belonging to the calculation unit for which the difference sum calculator 150 is responsible to calculate a difference sum for each calculation unit. In the example illustrated in FIG. 7, difference sum calculator 150 include 8 (=32 samples/4 samples) difference sum calculators 150-0 to 150-7.

Each difference sum calculator 150 outputs the difference sum value, ss0 to ss7, to the difference accumulation calculating section 152. Difference accumulation calculating section 152 calculates each partial sum of the difference sum values, ss0 to ss7, for the respective calculation units, calculates an accumulated difference value from the predetermined reference point in time up to each calculation unit, and allows latch register 158 to hold the accumulated difference value. The accumulated difference value is indicative of the bias of the signal level accumulated from the predetermined reference point in time, and can be calculated using the following formulas. In the formulas, ss* denotes the difference sum value for the *th calculation unit (in the example illustrated in FIG. 7, * is 0 to 7), and so* denotes the accumulated difference value for the *th calculation unit.

a. $so0 = LeakSum + ss0$ b. $so1 = LeakSum + ss0 + ss1$ c. $so2 = LeakSum + ss0 + ss1 + ss2$ d. ...

e. $so7 = LeakSum + ss0 + \ldots + ss7$

[Formula 1]

The accumulated difference value so7 is input to latch register 170 and passed as LeakSum for calculations in the next clock cycle. Furthermore, the accumulated difference values so0 to so7 for the respective calculation units are input to the latch registers 158-0 to 158-7.

In the process flow shown in FIG. 6, if every 32 symbols are processed during each clock cycle, the LeakSum can be used as the index value for the total amount of bias for the next clock cycle. Furthermore, if every 4 symbols are processed, the accumulated difference values so0 to so7 from the predetermined reference point in time up to each calculation unit can be used as the index value for the total amount of bias for each calculation unit. If every symbol is processed, the accumulated difference value from the predetermined reference point in time up to each symbol is separately calculated—in this example, each partial sum of the LeakSum and outputs from the difference calculators 148-1 to 148-32—and can be used as the index value for the total amount of bias for each symbol.

According to yet another embodiment, instead of the above-described accumulated difference value, a value obtained by multiplying the accumulated difference value by the bias value depending on the time constant for the variation model (equivalent to compensation values c0 to c7) can be used as the index value for the total amount of bias. In this case, the magnitude of a variation in offset depending on the time constant for the capacitive coupling can be taken into account.

The baseband data on which the offset compensating process has been carried out by the above-described circuit is input to DAC 124 and output to transmission circuit 128 in the succeeding RF section 114 as a baseband signal. The baseband signal is transmitted to the reception side wireless communication apparatus 180.

FIG. 8 is a diagram illustrating an offset compensating process on the transmission side along with signal waveforms. FIG. 8(A) shows the waveform of the uncorrected baseband signal by way of example. FIG. 8(B) shows a time series of compensation values calculated for the baseband signal illustrated in FIG. 8(A) by way of example. FIG. 8(C) shows the waveform of the corrected baseband signal with the waveform thereof deformed based on the time series of compensation values. FIG. 8(D) schematically shows a reception baseband signal waveform observed in the reception side wireless communication apparatus 180 receiving the corrected baseband signal.

Figure 8A:
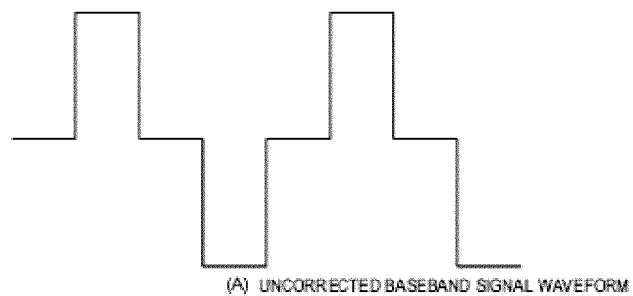
FIG. 8(A) shows the waveform of the uncorrected baseband signal by way of example.
Figure 8B:
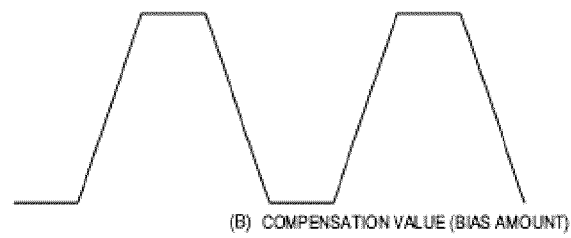
FIG. 8(B) shows a time series of compensation values calculated for the baseband signal illustrated in FIG. 8(A) by way of example.
Figure 8C:
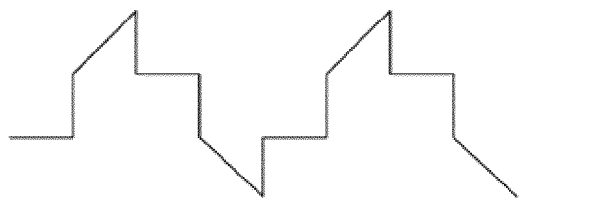
FIG. 8(C) shows the waveform of the corrected baseband signal with the waveform thereof deformed based on the time series of compensation values.
Figure 8D:
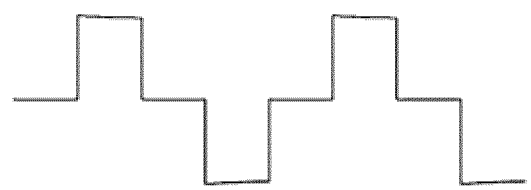
FIG. 8(D) schematically shows a reception baseband signal waveform observed in the reception side wireless communication apparatus 180 receiving the corrected baseband signal.

When wireless communication apparatus 110 directly transmits such a signal waveform as shown in FIG. 8(A), the signal waveform distorted according to the time constant may be observed on the reception side due to the capacitive coupling on the path. In contrast, wireless communication apparatus 110, according to the present embodiment, adds the compensation value shown in FIG. 8(B) to the original uncorrected baseband signal by the offset compensation process to output such an externally distorted waveform as shown in FIG. 8(C). However, if the baseband signal with such a waveform deformed as shown in FIG. 8(C) is communicated to the reception side, such an uncorrected, approximately ideal waveform, as shown in FIG. 8(D), is observed on the reception side due to the coupling on the path.

Figure 9A:
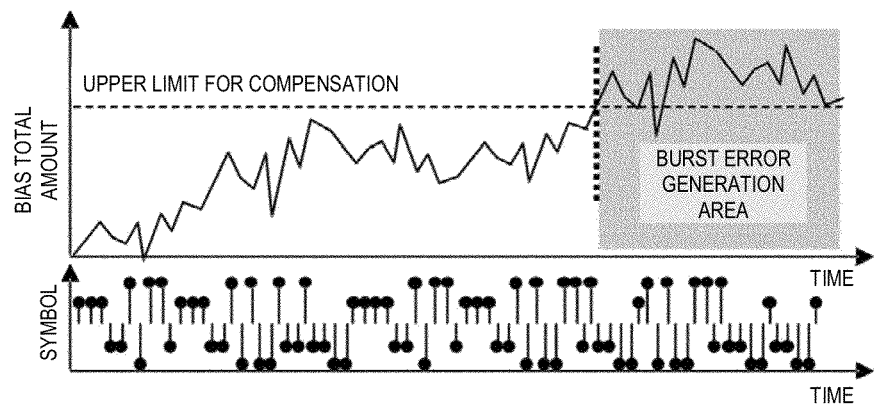
FIG. 9(A) illustrates a temporal variation in the total amount of bias observed when the above-described symbol manipulation process is not applied.
Figure 9B:
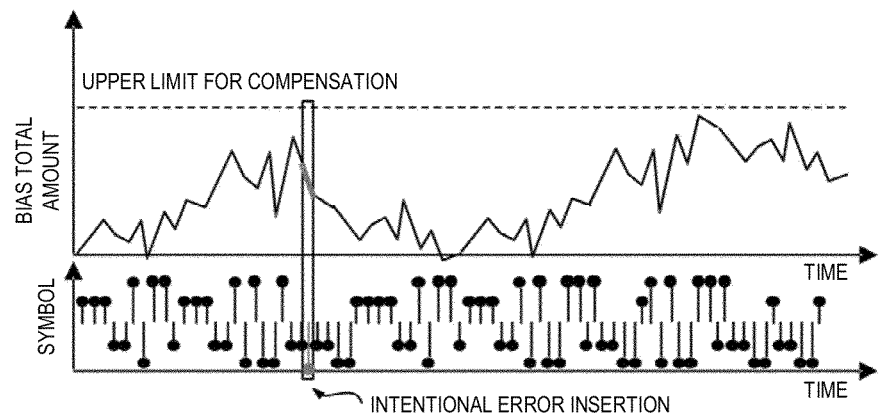
FIG. 9(B) illustrates a temporal variation in the total amount of bias observed when the above-described symbol manipulation process is applied.

FIG. 9 is a diagram showing a temporal variation in the total amount of bias of the signal level observed during transmission of a predetermined symbol sequence. FIG. 9(A) illustrates a temporal variation in the total amount of bias observed when the above-described symbol manipulation process is not applied. FIG. 9(B) illustrates a temporal variation in the total amount of bias observed when the above-described symbol manipulation process is applied. FIG. 9(A) and FIG. 9(B) show an upper limit at which offset compensation can be carried out according to the dynamic range of the above-described DAC 124 with a wavy line.

If the symbol manipulation process is not carried out, the offset compensation is precluded from being performed once the total amount of bias exceeds the upper limit at which offset compensation can be carried out (as shown by a hatched area), resulting in a burst error. If the range of offset compensation is sufficiently wide according to the length of a transmission frame, the DC offset can be sufficiently compensated for. However, the range of offset compensation is finite. In particular, high-speed DACs with a wide dynamic range are not easily available or are very expensive.

Furthermore, high-capacity streaming transmission such as transmission and reception of high-vision video data are in great need for the millimeter wave wireless communication technique. A reduced frame length increases the rate of the overhead of the frame length of the portions other than a payload such as a header and an error correcting code portion, reducing execution speed. Thus, the frame length is desirably increased. However, an increased frame length increases the probability of preventing compensation from being achieved within the range of offset compensation, resulting in a high likelihood of a burst error. Furthermore, frequent burst errors lead to the need for frequent retransmission of frames. This unfavorably affects streaming transmission, which needs a reduced latency.

In contrast, if the symbol manipulation process is carried out, when the upper limit for compensation for the bias total amount is approached, a symbol inverting operation is performed before the upper limit is exceeded as shown in FIG. 9(B). Then, the bias of the signal level is mitigated to set the compensation value within the range. At this time, the symbol inversion causes an error to be introduced. However, the error occurs discretely and can thus be efficiently corrected on the reception apparatus side. Therefore, an increase in the number of compensation values needed for offset compensation can be restrained using the margin error correcting capability. This suppresses a possible burst error associated with the coupling in spite of relatively long frames.

The signal processing based on the intentional error introduction described above allows suitable prevention of a burst error caused by a variation in reference level associated with the coupling and observed on the reception apparatus side, using the margin error correcting capability of the communication apparatus without the need for additional bit insertion such as coding. This further enables a reduction in the frequency of retransmission control and the error rate in the whole system. The signal processing based on the intentional error introduction, particularly in combination with the offset compensation process as described above, allows a possible burst error to be suitably prevented within the range of compensation in spite of relatively long frames. This is advantageous for high-speed high-capacity streaming transmission.

A numerical analysis model that simulates a communication system was constructed, and simulation was carried out assuming various noise environments. The simulation was carried out using Communications System Toolbox (registered trade mark), which is numerical analysis software MATLAB (The MathWorks, Inc). In the simulation, communication system configuration was defined for a case where neither the offset compensation nor the symbol manipulation process was carried out and for a case where both the offset compensation and the symbol manipulation process were carried out. For a case where a bit sequence with a predetermined length was transmitted via additive white Gaussian noise (AWGN) channels with various intensities, a bit error rate (BER) and the maximum value of needed offset compensation values were determined. As a modulation scheme, 16QAM was adopted, and as a channel coding scheme for calculation of the BER after error correction, the Reed-Solomon code (255, 239) was used. The bit sequence is a random bit sequence having a length of 1 Mbit and containing data generated using pseudorandom numbers. The maximum value of offset compensation values is the maximum value of the absolute values of compensation values needed for 10,000 trials using the random bit sequence without any upper or lower limit provided for the compensation values.

Figure 10:
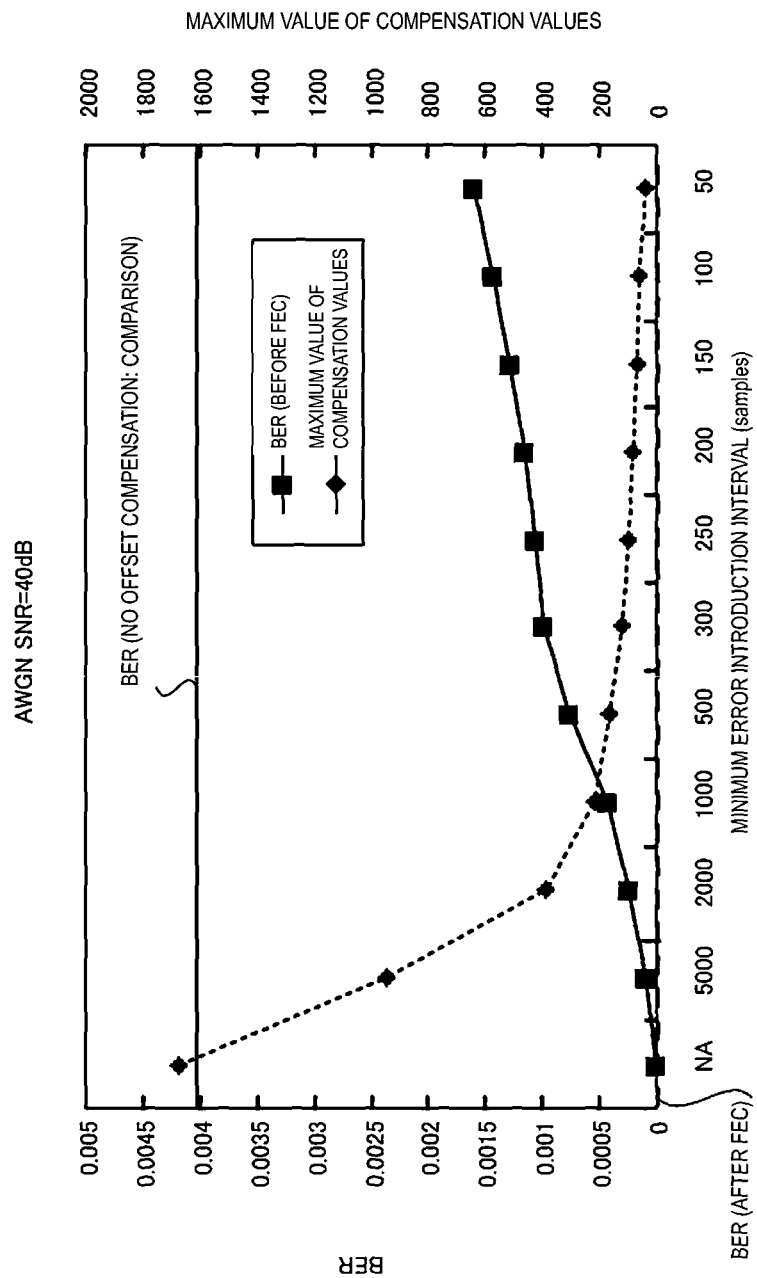
FIG. 10 is a graph showing a plot of BER (left axis) and the maximum value of offset compensating values (right axis) determined in the case of passage through an AWGN channel with a SNR of 40 dB.

FIG. 10 is a graph showing a plot of the BER (left axis) and the maximum value of the offset compensation values (right axis) determined in the case of passage through an AWGN environment channel with a SNR of 40 dB. In the graph shown in FIG. 10, the BER value shown by a gray solid line represents an error rate in Example 1 for comparison in which the offset compensation is not carried out, and is indicative of a burst error caused by the lack of offset compensation.

Furthermore, the axis of abscissas of the graph shown in FIG. 10 represents the minimum error introduction interval, and NA corresponds to Example 2 for comparison in which the symbol manipulation process was not carried out. Even in this case, the DC offset was compensated for to prevent a possible error caused by the DC offset. The amount of noise is incomparable to 40-dB AWGN, which may cause an error during demodulation, and the error rate was 0. However, the maximum value of compensation values needed for the offset compensation was 1,672 in the case of the above-described frame length.

As shown in FIG. 10, the error rate before error correction increased with a decrease in minimum error introduction interval from NA due to the introduction of symbol inversion. However, the maximum value of the compensation values needed for the offset compensation substantially decreased. For example, when the minimum error introduction interval decreased down to 300 samples, the maximum value of the compensation values was successfully reduced down to about 120, with the BER before correction maintained at a $10^{-4}$ level. The results of the experiments are shown in Table 1 below.

TABLE 1

|  | Maximum value of compensation values | BER (before FEC) |
| --- | --- | --- |
| Example 1 | NA | $4.05 \times 10^{-3}$ |
| Example 2 | 1672 | 0 |
| Example 3 | 119 | $9.78 \times 10^{-4}$ |

In Example 2 in which the symbol manipulation process is not carried out, the maximum value of the compensation values is large and 1,672, as shown in Table 1. It is thus expected that longer frames make this configuration difficult to implement using the dynamic range of standard high-speed DACs. On the other hand, the symbol manipulation according to the present embodiment allows, for example, the minimum error introduction interval to be set to about 300 samples and enables the maximum value of the compensation values to be reduced to about 120. Thus, even standard 8-bit DACs allow the configuration to be easily implemented.

Furthermore, the BER before correction, which is increased by error introduction, is caused by a random error and can be sufficiently corrected by standard error correcting codes (for example, FEC (Forward error correction) with RS (255, 239)). It is understood that, in the graph in FIG. 10, the BER after FEC, shown by a gray wavy line, represents the error rate after FEC and has a very small value.

Figure 11:
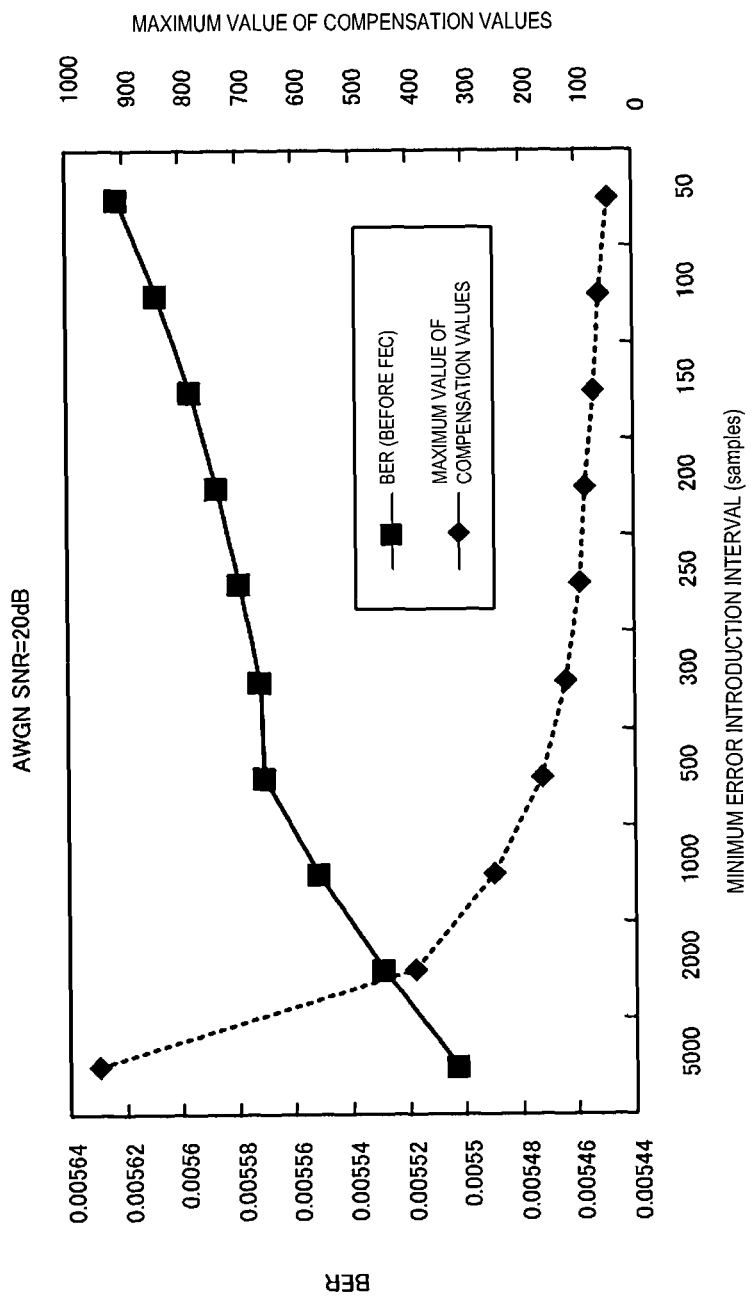
FIG. 11 is a graph showing a plot of BER (left axis) and the maximum value of offset compensating values (right axis) determined in the case of passage through an AWGN channel with a SNR of 20 dB.

FIG. 11 is a graph showing a plot of the BER (left axis) and the maximum value of the offset compensation values (right axis) determined in the case of passage through an AWGN environment channel with a SNR of 20 dB unlike in FIG. 10. The SNR of 20 dB results in a larger BER value than the signal to noise ratio of 40 dB but suppresses a burst error to allow the error to be sufficiently corrected by FEC. The results of the experiments indicate that, even in an environment with noise of about 20 dB, when an error is intentionally introduced at a predetermined frequency so as to eliminate the bias of symbols, a possible burst error can be suitably prevented.

As described above, the embodiment can provide a transmission apparatus, a reception apparatus, a communication system, a circuit apparatus, a communication method, and a program which enable a suitable reduction in burst errors caused by a variation in reference level associated with coupling and observed on a reception apparatus side.

In particular, an increased data rate leads to the need for capacitors exhibiting excellent frequency characteristics on a high frequency side. Capacitive elements are desirably adopted which have a large capacity enough to suppress the variation in reference level associated with the coupling. However, the increased capacity of the capacitors tends to degrade the frequency characteristics, making design constraints more severe in association with the increased data rate.

In contrast, the above-described configuration intentionally introduces an error to enable a suitable reduction in the bias of the signal level, which may vary the reference level on the reception side in association with the coupling. Particularly in high-speed communication such as millimeter wave communication, the occurrence of DC offset associated with the coupling is unavoidable as described above. Thus, the above-described correction process is suitably applicable to the high-speed communication.

Some or all of the above-described functional sections may be mounted on a programmable device (PD), for example, a field programmable gate array (FPGA) or packaged into an ASIC (Application Specific Integrated Circuit). The functional sections can be distributed, via a recording medium, in the form of circuit configuration data (bit stream data) downloaded into a PD in order to implement the functional sections in the PD and data described by an HDL (Hardware Description Language), a VHDL (Very high speed integrated circuit Hardware Description Language), Verilog-HDL, or the like for generating the circuit configuration data.

The embodiments of the present invention have been described but are not limited to the above-described embodiments. Other embodiments may be provided, or additions, changes, deletions, or the like may be made to the embodiments within a range conceivable by those skilled in the art. Any aspect is included within the scope of the present invention as long as the aspect exerts the actions and effects of the present invention.

What is claimed is:

1. A transmission apparatus communicatively coupled to a reception apparatus, the transmission apparatus comprising:
a monitoring section that monitors an index value for a total amount of bias of a signal level in signals;
a symbol identifying section that identifies a target symbol to be changed in a transmission symbol sequence containing the signals, based on the index value for the total amount of bias of the signal level;
a symbol position changing section that changes a position of the target symbol to a position of a signal point that serves to reduce the bias of the signal level; and
a transmission section that transmits signals included in a changed transmission symbol sequence to the reception apparatus.

2. The transmission apparatus according to claim 1, wherein the position of a signal point for the target symbol on a signal space diagram is changed to introduce an error correctable based on redundancy applied by the transmission apparatus.

3. The transmission apparatus according to claim 1, further comprising a variation compensating section that deforms an output waveform of a signal included in the transmission symbol sequence so as to offset a variation in a reference level associated with the reception apparatus caused by coupling present between the transmission apparatus and the reception apparatus, based on a model for the variation in the reference level.

4. The transmission apparatus according to claim 2, wherein the symbol identifying section identifies a symbol increasing the bias of the signal level in the transmission symbol sequence as the target symbol when the index value for the total amount of bias of the signal level falls out of an allowable reference range.

5. The transmission apparatus according to claim 4, wherein the symbol identifying section further identifies the target symbol on condition that the target symbol is away from the changed symbol by at least a predetermined distance.

6. The transmission apparatus according to claim 5, further comprising a setting section that sets the predetermined distance according to a count value of error corrections in a notification from the reception apparatus.

7. The transmission apparatus according to claim 1, further comprising data that associates a set of signal points with one another, wherein the signal points of the set meet one or both of a condition for minimizing an edit distance between codes represented by an unchanged signal point and a changed signal point and a condition for maximizing a difference in signal level between the unchanged signal point and the changed signal point.

8. A reception apparatus communicatively coupled to a transmission apparatus, the reception apparatus comprising:
a reception section that receives signals included in a received symbol sequence sent from the transmission apparatus; and
an error correcting section that corrects an error in the received symbol sequence,
wherein a comparison between the received symbol sequence and a received symbol sequence with corrected error indicates that the received symbol sequence with corrected error includes at least a change in a symbol position of a symbol received when or after an index value for a total amount of bias of a signal level calculated from a reference point in time falls out of a predetermined reference range, wherein the change in the symbol position serves to reduce a bias of a signal level.

9. A communication system comprising a reception apparatus and a transmission apparatus communicatively coupled to the reception apparatus, the transmission apparatus comprising:
a monitoring section configured to monitor an index value for a total amount of bias of a signal level in signals;
a symbol identifying section configured to identify a target symbol to be changed in a transmission symbol sequence comprising the signals, based on the index value for the total amount of bias of the signal level;

a symbol position changing section configured to change a position of the target symbol to a position of a signal point where the bias of the signal level is reduced; and a transmission section configured to transmit signals included in the changed transmission symbol sequence to the reception apparatus, and the reception apparatus comprising:

a reception section configured to receive signals included in a received symbol sequence sent from the transmission apparatus; and an error correcting section configured to correct an error in the received symbol sequence.

10. The communication system according to claim 9, further comprising a counting section counting corrected errors in the received symbol sequence and a notification section notifying the transmission apparatus of a count value of error corrections;

wherein the symbol identifying section identifies the target symbol on condition that the target symbol is away from the changed symbol by at least a predetermined distance, and the transmission apparatus further comprises a setting section that sets the predetermined distance according to the count value of error corrections in a notification from the reception apparatus.

11. A circuit apparatus generating a signal output to a succeeding stage via a coupling element, the circuit apparatus comprising:

a monitoring section that monitors an index value for a total amount of bias of a signal level in signals;

a symbol identifying section that identifies a target symbol to be changed in a transmission symbol sequence comprising the signals, based on the index value for the total amount of bias of the signal level;

a symbol position changing section that changes a position of the target symbol to a position of a signal point serving to reduce a bias of the signal level; and an output section that outputs signals included in the changed transmission symbol sequence to a succeeding stage.

12. A communication method carried out between a reception apparatus and a transmission apparatus communicatively coupled to the reception apparatus, the communication method comprising the steps of:

monitoring, using the transmission apparatus, an index value for a total amount of bias of a signal level in signals;

identifying, using the transmission apparatus, a target symbol to be changed in a transmission symbol sequence including the signals, based on the index value for the total amount of bias of the signal level;

changing, using the transmission apparatus, a position of the target symbol to a position of a signal point serving to reduce the bias of the signal level; and transmitting, using the transmission apparatus, signals included in the changed transmission symbol sequence to the reception apparatus.

13. The communication method according to claim 12, further comprising a step of deforming, using the transmission apparatus, an output waveform of a signal included in the transmission symbol sequence so as to offset a variation in a reference level on the reception apparatus side caused by coupling present between the transmission apparatus and the reception apparatus, based on a model for the variation in the reference level on the reception apparatus side.

14. The communication method according to claim 13, wherein the identifying step comprises a step of identifying, using the transmission apparatus, the target symbol on condition that the symbol increases the bias of the signal level in the transmission symbol sequence and the symbol is away from the last changed symbol by at least a predetermined distance, when the index value for the total amount of bias of the signal level falls out of an allowable reference range.

15. The communication method according to claim 12, wherein an unchanged signal point and an changed signal point meet one or both of a condition for minimizing an edit distance between codes represented by the unchanged signal point and the changed signal point and a condition for maximizing a difference in signal level between the unchanged signal point and the changed signal point.

16. A computer readable, non-transitory article of manufacture tangibly embodying computer readable instructions which, when executed, cause a computer to carry out the steps of a method according to claim 12.

* * * * *